UNITED STATES PATENT OFFICE.

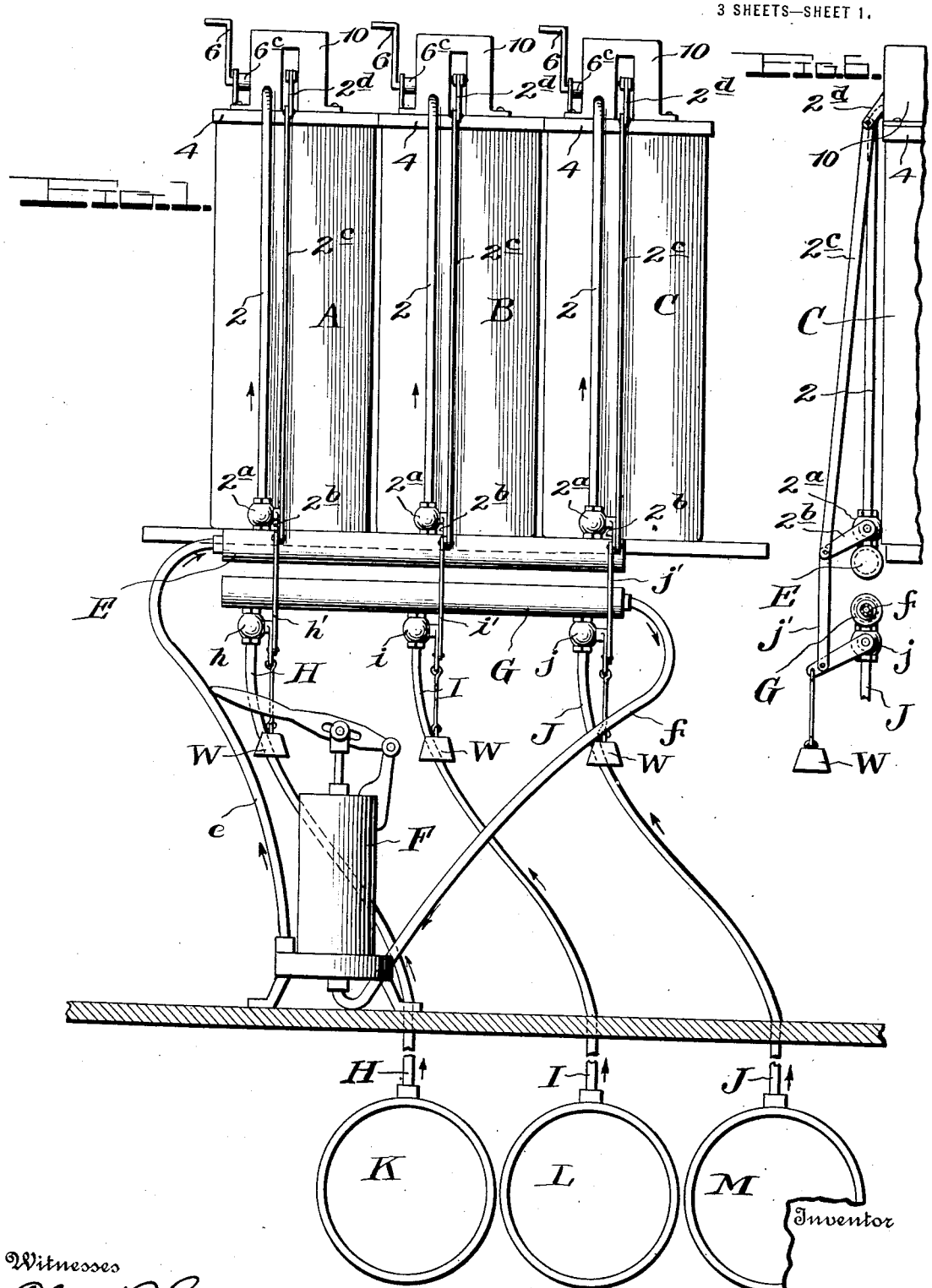

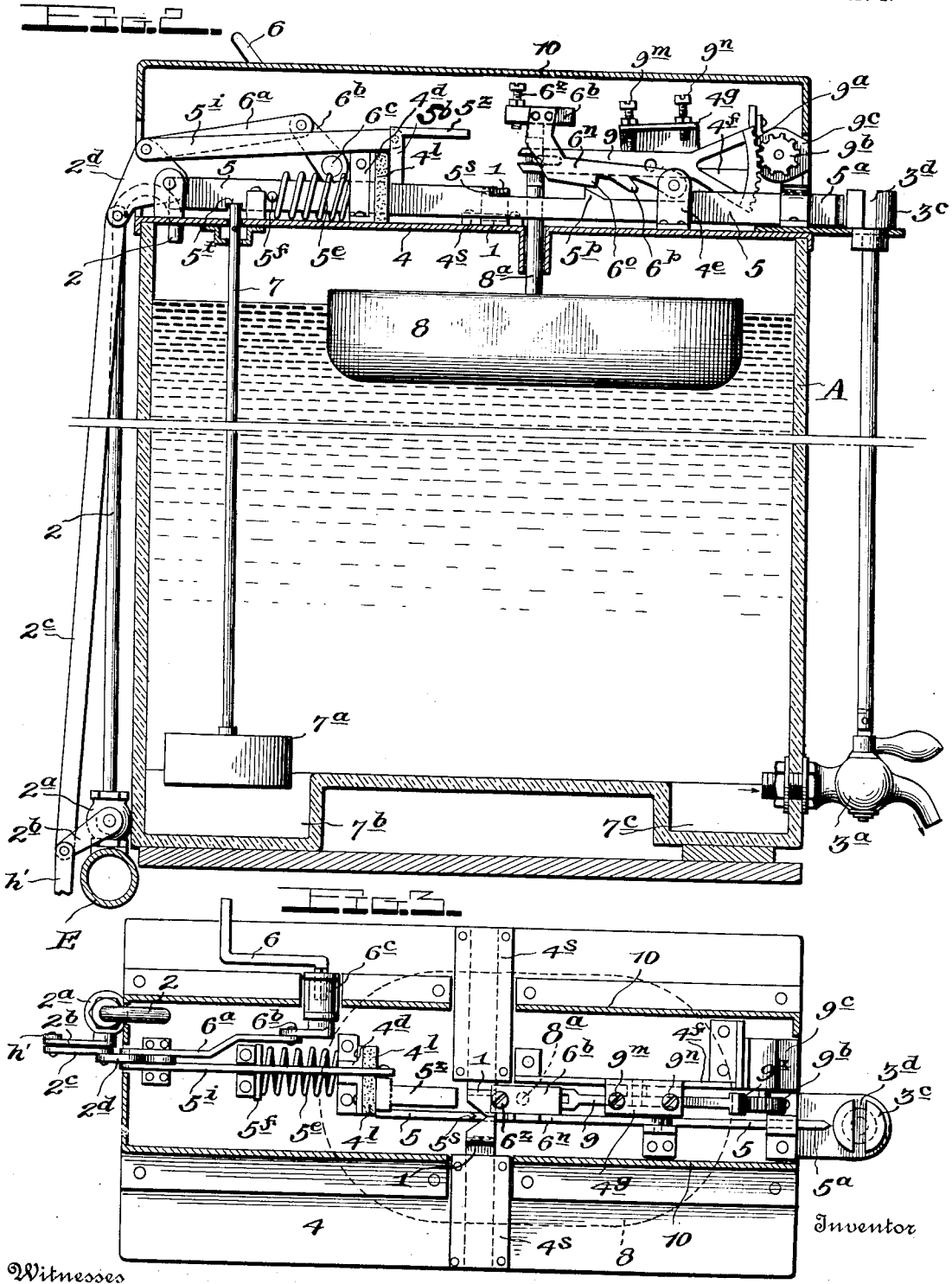

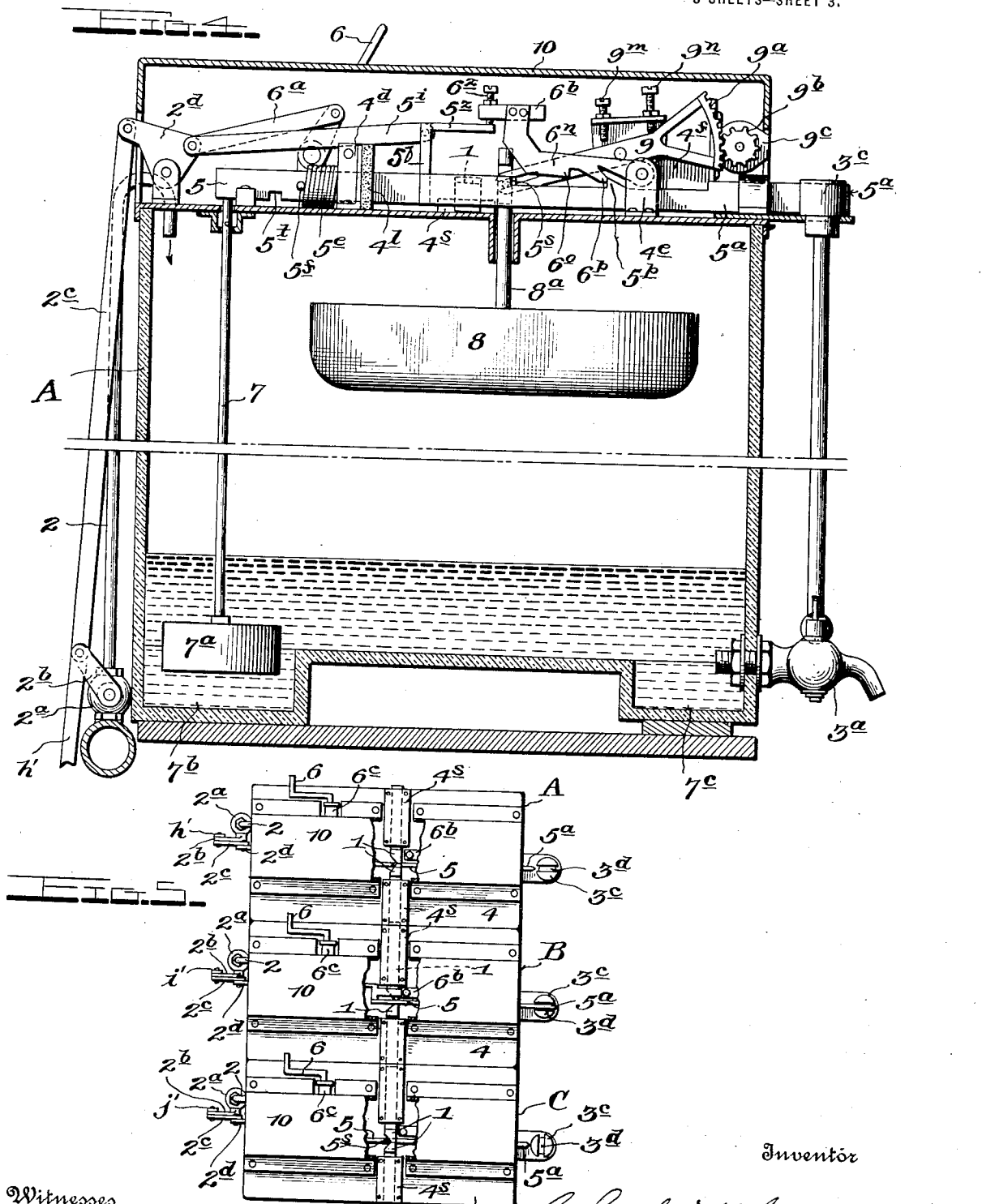

CHARLES F. BROWN, OF NEW YORK, N. Y., ASSIGNOR TO UNIVERSAL LIQUID REGISTER CO., OF NEW YORK, N. Y., A CORPORATION OF NEW YORK.

LIQUID DISPENSING AND MEASURING APPARATUS.

1,206,204. Specification of Letters Patent. Patented Nov. 28, 1916.

Application filed October 6, 1914. Serial No. 865,274.

*To all whom it may concern:*

Be it known that I, CHARLES F. BROWN, a citizen of the United States, residing at New York, in the county of New York and State of New York, have invented certain new and useful Improvements in Liquid Dispensing and Measuring Apparatus; and I hereby declare that the following is a full, clear, and exact description thereof, reference being had to the accompanying drawings, which form part of this specification.

This invention is a novel improvement in liquid dispensing and measuring apparatus of the type in which the liquid to be dispensed is passed into a measuring vessel provided with inlet and outlet valves and mechanism whereby when the inlet valve is closed the outlet valve is locked, so that both valves cannot be open simultaneously, and vice versa; also with means whereby the amount of liquid admitted to the vessel is registered; and also with means whereby when the vessel is once filled no further liquid can be introduced thereinto until after it has been entirely emptied; thus improper passage of liquid through the measuring vessel is prevented.

The present invention provides a novel and simplified measuring apparatus embodying the several features above noted.

A further object of the invention is to provide means whereby a plurality of such measuring and dispensing apparatus can be arranged side by side and supplied from various containers by means of a single pumping apparatus; and also to provide means whereby when one container is being filled the other containers will be locked, so that only one container can be filled at a time.

One practical form of apparatus embodying the several features of the invention is illustrated in the accompanying drawings and I will explain same in detail with reference thereto, to enable others skilled in the art to manufacture and use the invention, and will set forth in the claims the novel features for which protection is desired.

In said drawings:—Figure 1 is a diagrammatic view showing a plurality of measuring and dispensing vessels, a pump, and means whereby these vessels may be independently filled through said pump. Fig. 2 is an enlarged sectional elevation of one of the measuring vessels, showing the inlet and outlet valve controlling devices, and the registering mechanism operating devices, in elevation with the inlet valve locked. Fig. 3 is a top plan view of the valve controlling and register operating devices. Fig. 4 is a similar view to Fig. 3 showing the position of the parts when the outlet valve is locked. Fig. 5 is a detail top plan view of Fig. 1 enlarged, showing their interlocking devices. Fig. 6 is a detail side view of Fig. 1.

Referring to the drawings, A, B, C, represent three similar measuring and dispensing vessels; preferably each vessel is rectangular in cross section so that a number can be placed close together side by side. The vessels being constructed alike a description of one will explain all.

Preferably connected with the top of each vessel is the discharge end of a supply pipe 2, the other end of which is connected to a header tube E and communication between the pipe and the tube being controlled by a valve $2^a$. One end of the tube E is connected by a pipe to the outlet of a pump F, which may be manually operable and of any suitable construction. The inlet of the pump F is connected by a pipe $f$ to one end of a second header tube G, which tube is connected by pipes H, I, J, with liquid supplies which may be barrels or other suitable liquid holders, indicated at K, L, M. Communication between the pipes H, I, J, and the tube G is controlled by valves $h$, $i$, $j$, of any suitable construction. If for example it is desired to fill the vessel A from the container K, the valve connecting the header E with the vessels B and C is closed, and the valve $2^a$ connecting header E with vessel A is opened; and the valves $i$ and $j$ are closed; then when the pump F is operated liquid will be drawn from the container K through the pipe H into the header G and passed thence through pipe $f$ into pump F and passed thence through pipe $e$ into header E, and thence into vessel A. If vessel B was to be filled from vessel L, the valves $2^a$ in the pipes 2 of containers A and C would be closed and the valve $2^a$ in pipe 2 of container B opened; valves $h$ and $j$ would also be closed and valve $i$ opened; then when pump F was operated liquid would be drawn through from container L and passed through header G to pump F and thence through header E into vessel B. Vessel C could be similarly filled by closing and opening the proper valves. It will be seen that with this arrangement liquid from any container can be directed to its proper vessel. If different liquids are to be supplied it is desirable to insure the opening and closing of the proper valves, and I provide for this by connecting the cranks or arms of valve $2^a$ of vessel A and to valve $h$ by means of a link $h'$. Similarly the valve $2^a$ of the vessel B is connected with valve $i$ by a link $i'$; and similarly the valve $2^a$ of vessel C is connected with valve $j$ by a link $j'$. The links connect the valves in such manner that when the valve $2^a$ of any vessel is opened, the corresponding valve in the header G is opened; and when such valve $2^a$ is closed, the corresponding valve is closed. All of the valves are normally closed, and consequently if the operator opens valve $2^a$ of any one of the vessels, the corresponding valve in the header G will be opened; but the other valves will remain closed, so that the operator simply has to open the valve $2^a$ of the vessel to be filled and then operate the pump in order to fill such vessel from the proper supply. I also provide means hereinafter described whereby the opening of the valve $2^a$ of any vessel prevents the opening of valve $2^a$ of the adjacent vessel.

In using this apparatus the parts are so arranged that after a vessel has been filled the headers E, G, and pump F and the connecting pipes may be vented so that any liquid remaining therein may return to the original container K, (L or M), so that such liquid will not be switched into the next vessel filled, if it is desired to prevent the mixing of one kind of liquid with another, as f. i. where vessels are to be filled with different liquids.

The opening and closing of valve $2^a$ of each vessel is controlled by means connected with the vessel which I will now describe. As the devices controlling each valve $2^a$ are identical the description of one will explain all.

As shown, the stem of valve $2^a$ is provided with a crank arm $2^b$ to which the link $h'$ (or $i'$ or $j'$) is pivotally connected as shown. This arm $2^b$ is also connected by a link $2^c$ to one arm of a bell crank lever $2^d$ pivotally secured to the top of the vessel, preferably to a metal plate 4 attached to the top of the vessel; the other arm of this bell crank lever is pivotally connected by a link $6^a$ to a crank arm $6^b$ on a rock shaft $6^c$ provided with a handle 6 by which it can be rocked. When the handle 6 is moved in one direction the valve $2^a$ will be opened, and when the handle is moved in the opposite direction the valve $2^a$ will be closed.

The valve $2^a$ is locked in both open and closed positions by means of a slidable controlling bar 5 which is normally projected rearwardly by means of a spring $5^e$ interposed between a slotted stud $4^d$ on the plate 4 and a pin $5^f$ transfixing the bar. Bar 5 has an upstanding member $5^b$ pivotally connected by a link $5^i$ to the upper arm of the bell crank $2^d$, as shown, and when the spring $5^e$ moves the bar it will operate the bell crank and close the valve $2^a$.

The bar 5 extends to the front of the vessel and when the bar is projected to open the valve its front end will engage with a diametrical notch or slot $3^d$ in a disk $3^c$ attached to the stem of the dispensing faucet or valve $3^a$. The notch $3^d$ is so disposed in the disk that the dispensing faucet will be locked in closed position when the end $5^a$ of the bar 5 is engaged with the notch $3^d$ (see Fig. 4) and the dispensing faucet cannot be opened until the bar 5 is retracted; and if the bar 5 is retracted (see Figs. 2 and 3) and the dispensing faucet is open bar 5 cannot be moved forward until the dispensing faucet is closed because disk $3^c$ will prevent forward movement of bar 5 unless and until notch $3^d$ is in register with the end $5^a$ of said bar. The return movement of the bar 5 under the action of spring $5^e$ may be cushioned by a rubber pad or buffer $4^i$ attached to stud $4^d$. The bar 5 is also provided with a tooth $5^p$ which is adapted to be engaged with teeth $6^o$, $6^p$, on a latching lever $6^n$ which is pivoted on a stud $4^e$ rising from the plate 4 and has a weight $6^b$ on its free end. The teeth $6^o$, $6^p$ are so arranged that if the bar 5 is started forward its tooth $5^p$ will be engaged by the tooth $6^o$ and the bar cannot be retracted until it has made a complete forward movement; but when the bar 5 has been projected as shown in Fig. 4 so as to lock the dispensing faucet and open the inlet valve, the bar is locked in such position by the engagement of the tooth $5^p$ with tooth $6^p$ and remains so locked until it is released by float operated devices when the vessel is filled. For this purpose a float 8 is arranged within the vessel and normally suspended at the top thereof by means of a rod $8^a$ which extends through an opening in the plate 4 below the projection $6^b$ of the latch lever $6^n$, and said rod $8^a$ is preferably pivotally connected to one end of an oscillating lever 9 which is pivotally mounted on a stud or guide flange $4^f$ rising from plate 4. When the liquid is withdrawn from the vessel the float 8 remains suspended near the top (see Fig. 4) but when the vessel is filled the float 8 will rise and rock the lever 9, and just as the float reaches its highest position, and when the vessel is supplied with the desired amount of liquid, the end of rod $8^a$ engages the lug $6^b$ on latch lever $6^n$ and lifts the latter thereby disengaging tooth $6^p$ from the tooth $5^p$, whereupon spring $5^e$ retracts bar 5 and automatically closes the valve $2^a$ and releases valve $3^a$.

On the other end of lever 9 is a segment 9<sup>a</sup> which meshes with a pinion 9<sup>b</sup> on the shaft of a rotary register 9<sup>c</sup> of ordinary construction, so that when the float 8 rises the filling of the vessel is registered, but when the float drops no registration is effected. Correct actuation of the register by the lever 9 is insured by means of regulating screws 9<sup>m</sup>, 9<sup>n</sup> tapped through an overhanging flange 4<sup>g</sup> on the standard 4<sup>f</sup> and arranged at opposite sides of the pivot of the lever 9 so that screw 9<sup>m</sup> will properly limit the rise of the float, and the screw 9<sup>n</sup> will properly limit the dropping of the float and also the extent of float actuated oscillation of the lever 9.

When the controlling bar 5 is retracted so as to close valve 2<sup>a</sup> as specified, and while liquid is being withdrawn from the vessel, the bar 5 is locked in retracted position by means of a rod 7 extending through an opening in the plate 4 and connected at its lower end to a small float 7<sup>a</sup> within the vessel. The upper end of this rod engages a notch 5<sup>t</sup> in the lower side of the bar 5, when the latter is in retracted position, see Fig. 2, and will prevent forward movement of the bar 5, and opening of the valve 2<sup>a</sup>, until the vessel has been emptied of its liquid. The construction is such that float 7<sup>a</sup> locks bar 5 in retracted position holding valve 2<sup>a</sup> closed so long as there is liquid in the vessel, while permitting the dispensing faucet 3<sup>a</sup> to be opened or closed at will until the vessel is emptied. When the vessel is emptied float 7 drops and disengages rod 7<sup>a</sup> from notch 5<sup>t</sup> (see Fig. 4) and then the valve 2<sup>a</sup> may be opened, provided faucet 3<sup>a</sup> is first closed so that the notch 3<sup>d</sup> registers with the bar 5. Then the operator by turning the crank 6 can move bar 5 forward, and in so doing the end 5<sup>a</sup> of bar 5 first engages the notch in the disk 3<sup>c</sup> and locks the faucet 3 closed, and tooth 5<sup>p</sup> is engaged by tooth 6<sup>o</sup> so that bar 5 cannot be retracted and the faucet or valve 3<sup>a</sup> is locked in closed position before the inlet valve 2<sup>a</sup> is opened; the further forward movement of the bar 5 causes the opening of the valve 2<sup>a</sup>, and thus liquid can be admitted into the vessel A for example as above described until the float 8 is raised and causes the detent lever 6<sup>n</sup> to release bar 5 as described whereupon spring 5<sup>e</sup> retracts bar 5, closing the valve 2<sup>a</sup> and releasing the valve 3<sup>a</sup>, and the bar 5 is locked in this retracted position by the rod 7 engaging notch 5<sup>t</sup> as described. The parts remain in this position until the vessel has been again emptied and float 7<sup>a</sup> again releases bar 5 as above described.

To insure the release of the bar 5 at the proper moment by the float 8, a regulating screw 6<sup>z</sup> may be tapped through the weighted end 6<sup>b</sup> of lever 6<sup>n</sup> and the end of this screw will engage a finger 5<sup>z</sup> on the upper end of the member 5<sup>b</sup>, see Figs. 2 and 4, when the bar 5 is moved outward, see Fig. 4. By adjusting the screw 6<sup>z</sup> when in contact with the finger 5<sup>z</sup> the extent of engagement between the teeth 5<sup>p</sup> and 6<sup>p</sup> can be regulated so that a very slight upward movement of the lever 6<sup>b</sup> will suffice to release the bar 5.

With the construction shown the inlet valve 2<sup>a</sup> and outlet valve 3<sup>a</sup> of the vessel cannot both be simultaneously open; one must be closed before the other is opened; the supply cannot be opened until the vessel is fully emptied, and the outlet cannot be opened until the vessel is properly filled.

In order to prevent the inlet valves of any two adjacent vessels arranged as shown in Figs. 1 and 5 being simultaneously opened, I provide the following devices:—At opposite sides of and at right angles to the controlling bar 5 of each vessel are arranged transversely movable slides 1, which may be mounted in guides and retainers 4<sup>s</sup> attached to plate 4. The adjacent ends of the slides are bent up and over toward each other adjacent bar 5 and are adapted to normally contact, see Fig. 3, the bar 5 is provided with a beveled portion 5<sup>s</sup> (Fig. 3) which is adapted to simultaneously engage the beveled ends of the adjacent slides and force them apart when the bar 5 is projected to lock the valve 3 and open valve 2<sup>a</sup>, see Fig. 5. The valve controlling devices of each vessel are provided with similar slides 1, arranged in transverse alinement; if any bar 5 is moved forward so as to separate the slides the outer ends of such slides will be projected against the ends of the similar adjacent slides on the other vessels and thus shift the slides on the adjacent vessels so that they will lock bars 5 of such vessels (see Fig. 5) so that when the bar 5 of one vessel is projected to open its inlet valve the bars 5 of the other vessels will be locked.

The operative devices on top of each vessel should be inclosed within a housing or casing 10 of any suitable kind so that such devices cannot be tampered with; the crank shaft 6 can project outside of such casing so it can be operated when it is necessary to fill the vessel.

Each vessel is preferably made with a pocket 7<sup>b</sup> in its bottom in which the float 7 can descend, and with a pocket 7<sup>c</sup> with which the outlet valve 3<sup>a</sup> connects, so that the vessel will have to be practically wholly emptied before the float 7 will release the locking bar 5. As the vessel is designed to contain a certain predetermined amount of liquid, the amount of liquid which has been passed therethrough can be readily determined by observing the register; and it will be seen that the register is operated upon the ascent of the float 8 and is not operated when the float descends.

When the locking devices are applied to vessels arranged in a battery as in Fig. 1, the action of the spring 5ᵉ may be supplemented by weights W which can be suspended from the levers of valves h, i, j, as shown in Figs. 1–6.

The containers K, L and M are the original packages from which the liquid is passed through pipes H, I and J to header G; and thence into the pump F; and from pump F through pipe C into header E. From header E the liquid is passed through stop cocks B, and through pipes to the tanks A, B and C. Only one of the handles 6 can be pulled over at one time, thereby making it impossible for the contents of the supply tank M to be pumped into any of the dispensing tanks except the one which is connected with the supply tank. The supply tanks K, L and M are intended to hold different grades of liquid, for instance; tank K may contain low grade; tank L intermediate grade; and tank M high grade. If only one grade of liquid is used, only one supply tank and one dispensing tank need be used. The apparatus shown can be used for three different grades of oil, three different grades of wines, et cetera.

As the liquids are pumped from the supply tanks to the dispensing tanks, the quantity of each different grade is registered and recorded, thereby enabling the owner to ascertain at any time how much liquid has been taken out of the supply tank.

Float 8 is suspended as shown in Fig. 2, and does not descend more than is required to overcome and release the latch. The bar 8ᵃ by which the float 8 is suspended can be lengthened or shortened by an adjusting screw according to the density and weight of the liquid for which it is used in order that the liquid measure may also be correct. For instance the difference of the bar 8ᵃ would be .012 longer for spirits such as proof whisky than for water.

What I claim is:

1. In combination with a measuring vessel having inlet and outlet valves, a reciprocating bar adapted to lock the valves alternately, means for moving said bar, a float and connections for locking the bar in projected position, a second float and connections for locking the bar in retracted position and means for releasing the locking means.

2. In combination with a measuring vessel having inlet and outlet valves, a reciprocating bar adapted to lock the valves alternately, manually operable means for moving said bar in one direction and a spring for moving the bar in the opposite direction, a float and connections for locking the bar in projected position, a second float and connections for locking the bar in retracted position and means for releasing the locking means.

3. In a liquid measuring apparatus, the combination of a vessel having inlet and outlet valves, a reciprocatory bar adapted to alternately lock the valves in closed position, an oscillating lever beside said bar, means for limiting the oscillatory movement of said lever, a float, devices for locking the bar, and means connected with the float for releasing the locking devices, substantially as described.

4. In a liquid measuring apparatus, the combination of a vessel having inlet and outlet valves, a reciprocatory bar adapted to alternately lock the valves in closed position, an oscillating lever beside said bar, means for limiting the oscillatory movement of said lever, a float operatively engaged with said lever, devices for locking the bar when in projected position, and means operated by the float for releasing the locking devices, substantially as described.

5. In a liquid measuring apparatus, the combination of a vessel having inlet and outlet valves, a reciprocatory bar adapted to alternately lock these valves in closed position, an oscillating lever beside said bar, means for limiting the oscillatory movement of said lever, a float, means for locking the bar when in projected position, a device operated by the float for releasing said locking means; a spring for retracting the bar, and a second float and devices for locking the bar in its retracted position.

6. In a liquid measuring apparatus, the combination of a vessel having inlet and outlet valves, a reciprocatory bar adapted to alternately lock these valves in closed position, an oscillating lever beside said bar, means for limiting the oscillatory movement of said lever, a float operatively engaged with said lever, devices for locking the bar when in projected position, means operated by the float for releasing said locking devices; a spring for retracting the bar when released by said locking devices, a second float, devices operated thereby for locking the bar in its retracted position, and means for manually projecting said bar.

7. The combination of a plurality of vessels, a header, a valved pipe connection between such header and each vessel, a plurality of liquid supply pipes, a valve in each liquid supply pipe, and connections between the valve on each vessel supply pipe and the valve on the related liquid supply pipe whereby said valves will be simultaneously opened or closed.

8. The combination of a plurality of vessels, a header, a valved pipe connection between such header and each vessel, a plurality of liquid supply pipes, connections between each liquid supply pipe and said header, and a valve in each liquid supply pipe; with means whereby when the valve in the pipe leading to any one vessel is opened the valves for admitting liquid to the other vessels are locked closed.

9. The combination of a plurality of vessels, a header, a valved pipe connection between such header and each vessel, a plurality of liquid supply pipes, a valve in each liquid supply pipe, and connections between the valve on each vessel supply pipe and the valve on the related liquid supply pipe whereby said valves will be simultaneously opened or closed; with means whereby when the valve in the pipe leading to any one vessel is opened the valves for admitting liquid to the other vessels are locked closed.

10. The combination of a plurality of vessels, a header, a valved pipe connection between such header and each vessel, a second header, connections between said headers, a plurality of liquid supply pipes connected with said second header, and a valve in each liquid supply pipe, substantially as described.

11. The combination of a plurality of vessels, a header, a valved pipe connection between such header and each vessel, a second header, connections between said headers, a plurality of liquid supply pipes connected with said second header, a valve in each liquid supply pipe, and a connection between the valve on each vessel supply pipe and the valve on the related liquid supply pipe whereby said valves will be simultaneously opened or closed.

12. The combination of a plurality of vessels, a header, a valved pipe connection between such header and each vessel, a second header, connections between said headers, a plurality of liquid supply pipes connected with said second header, and a valve in each liquid supply pipe; with means whereby when the valve leading to any one vessel is opened the valves for admitting liquid to the other vessels are locked closed.

13. The combination of a plurality of vessels, a header, a valved pipe connection between such header and each vessel, a second header, connections between said headers, a plurality of liquid supply pipes connected with said second header, a valve in each liquid supply pipe, and a connection between the valve on each vessel supply pipe and the valve on the related liquid supply pipe whereby said valves will be simultaneously opened or closed; with means whereby when the valve leading to any one vessel is opened the valves for admitting liquid to the other vessels are locked closed.

14. The combination of a plurality of vessels, a header, a valved pipe connection between such header and each vessel, a pump, a connection between said pump and said header, a second header, a connection between said header and the inlet of said pump, a plurality of liquid supply pipes connected with said second header, and a valve in each liquid supply pipe, substantially as described.

15. The combination of a plurality of vessels, a header, a valved pipe connection between such header and each vessel, a pump, a connection between said pump and said header; a second header, a connection between said header and the inlet of said pump, a plurality of liquid supply pipes connected with said second header, a valve in each liquid supply pipe, and connections between the valve on each vessel pipe and the valve on the related liquid supply pipe whereby said valves will be simultaneously opened or closed.

16. The combination of a plurality of vessels, a header, a valved pipe connection between such header and each vessel, a pump, a connection between said pump and said header, a second header, a connection between said header and the inlet of said pump, a plurality of liquid supply pipes connected with said second header, and a valve in each liquid supply pipe; with means whereby when the valve in the pipe leading to one vessel is opened the valves for admitting liquid to the other vessels are locked closed.

17. The combination of a plurality of vessels, a header, a valved pipe connection between such header and each vessel, a pump, a connection between said pump and said header; a second header, a connection between said header and the inlet of said pump, a plurality of liquid supply pipes connected with said second header, a valve in each liquid supply pipe, and connections between the valve on each vessel pipe and the valve on the related liquid supply pipe whereby said valves will be simultaneously opened or closed; with means whereby when the valve in the pipe leading to one vessel is opened the valves for admitting liquid to the other vessels are locked closed.

18. In combination, a plurality of measuring vessels having inlet and outlet valves; with means whereby when the inlet valve of any vessel is opened the inlet valves of the other vessels are kept closed.

19. In combination, a plurality of measuring vessels having inlet and outlet valves, a reciprocatory bar and connections on each vessel for alternately locking its outlet and inlet valves; with means whereby when the bar on any vessel is moved in one direction the bars on the other vessels are locked.

20. In combination, a plurality of measuring vessels having inlet and outlet valves, a reciprocatory bar and connections on each vessel for alternately locking the outlet and inlet valves; with means actuated by such bar whereby when the inlet valve for any vessel is opened the inlet valves to the other vessels are kept closed.

21. In combination, a plurality of measuring vessels having inlet and outlet valves, a reciprocatory bar and connections on each vessel for alternately locking the outlet and inlet valves; with slides movable transversely of the bars and adjacent thereto, whereby when one set of slides is actuated by the movement of its related bar the slides of the adjacent bars are displaced to lock such bars.

22. In combination, a plurality of measuring vessels having inlet and outlet valves, a reciprocatory bar and connections on each vessel for alternately locking the outlet and inlet valves; with slides movable transversely of each bar and adjacent thereto, whereby when a bar is moved in one direction its related slides are shifted so that the slides of the adjacent bars are disposed and lock their bars, substantially as described.

In testimony that I claim the foregoing as my own, I affix my signature in presence of two witnesses.

CHARLES F. BROWN.

Witnesses:
 THOS. GUNNING,
 A. D. DICKERSON.